E. H. TAYLOR.
PAPER BOX MACHINE.
APPLICATION FILED MAR. 28, 1907.

1,113,715.

Patented Oct. 13, 1914.
7 SHEETS—SHEET 1.

Fig. 1.

Witnesses:
Oscar F. Hill
Edith J. Anderson

Inventor.
Eugene H. Taylor
by Chas. F. Randall
Attorney.

E. H. TAYLOR.
PAPER BOX MACHINE.
APPLICATION FILED MAR. 28, 1907.

1,113,715.

Patented Oct. 13, 1914.
7 SHEETS—SHEET 5.

Witnesses.
Oscar F. Hill
Edith J. Anderson.

Inventor:
Eugene H. Taylor
by Chas. F. Randall
Attorney.

UNITED STATES PATENT OFFICE.

EUGENE H. TAYLOR, OF HYDE PARK, MASSACHUSETTS, ASSIGNOR TO JOHN F. SPAULDING, OF BOSTON, MASSACHUSETTS, AND JAMES G. TEWKSBURY, OF SOMERVILLE, MASSACHUSETTS; ERNEST R. SPAULDING, OF WELLESLEY, MASSACHUSETTS, ADMINISTRATOR OF SAID JOHN F. SPAULDING, DECEASED; ANNA HUGHES TEWKSBURY ADMINISTRATRIX OF SAID JAMES G. TEWKSBURY, DECEASED.

PAPER-BOX MACHINE.

1,113,715.   Specification of Letters Patent.   Patented Oct. 13, 1914.

Application filed March 23, 1907. Serial No. 364,088.

*To all whom it may concern:*

Be it known that I, EUGENE H. TAYLOR, a citizen of the United States, residing at Hyde Park, in the county of Norfolk, State of Massachusetts, have invented a certain new and useful Improvement in Paper-Box Machines, of which the following is a specification, reference being had therein to the accompanying drawings.

The machine in which my present invention is embodied operates upon a blank which is scored or moistened on lines extending along opposite side-edges thereof and also across opposite ends adjacent the edges of the latter, and which is notched in its opposite side-portions adjacent the ends so as to leave upon the opposite ends of each end-flange laterally projecting portions forming bending-parts. It forms a box or cover by bending the end-flanges into place and turning the bending-parts of the same around into position at the sides, and bending the side-flanges into place outside the said bending-parts thus positioned, the side-flanges and the bending-parts of the end-flanges being secured together and the desired box-body or box-cover thereby formed. In the present embodiment of the invention provision is made for the application of paste as the securing means, but the use of other securing means may be provided for in other instances.

The invention includes devices for feeding the blanks in succession by a primary feed-movement from a stack or pile to an intermediate position where the securing means is applied automatically to the side-flanges, and then by a secondary feed-movement from the said intermediate position to the forming-devices, the said feeding-devices preferably being constructed and timed so that in the continued working of the machine, as a fresh blank is advanced from the stack or pile to the intermediate position, the preceding blank is advanced from the latter position to the forming devices. As the preferred means of affecting this two-step feed, as it may be called, the invention includes a double feeder, one portion thereof taking the fresh blank from the stack or pile and advancing it to the intermediate position and the other portion advancing the preceding blank from such position to the forming devices.

The invention includes, also, improved devices for ejecting the boxes from the machine.

Figure 14:
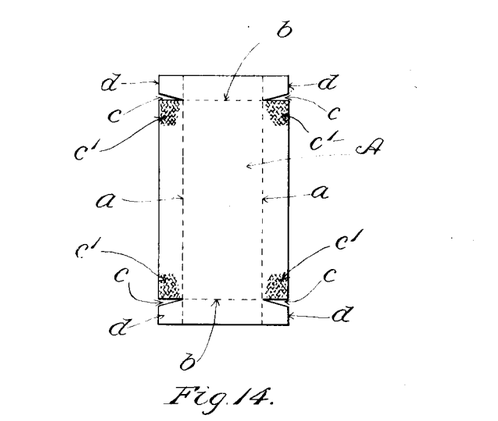
Fig. 14, Sheet 5, is a plan view of one of the blanks which are operated upon by my machine.

A blank such as the illustrated machine is designed to operate upon is shown at A, Fig. 14, Sheet 5, the side-scorings or lines of moistening being indicated at $a$, $a$, the end-scorings or lines of moistening at $b$, $b$, the notches at $c$, $c$, etc., and at $d$, $d$, etc., are the bending-parts of the end-flanges.

Figure 1:
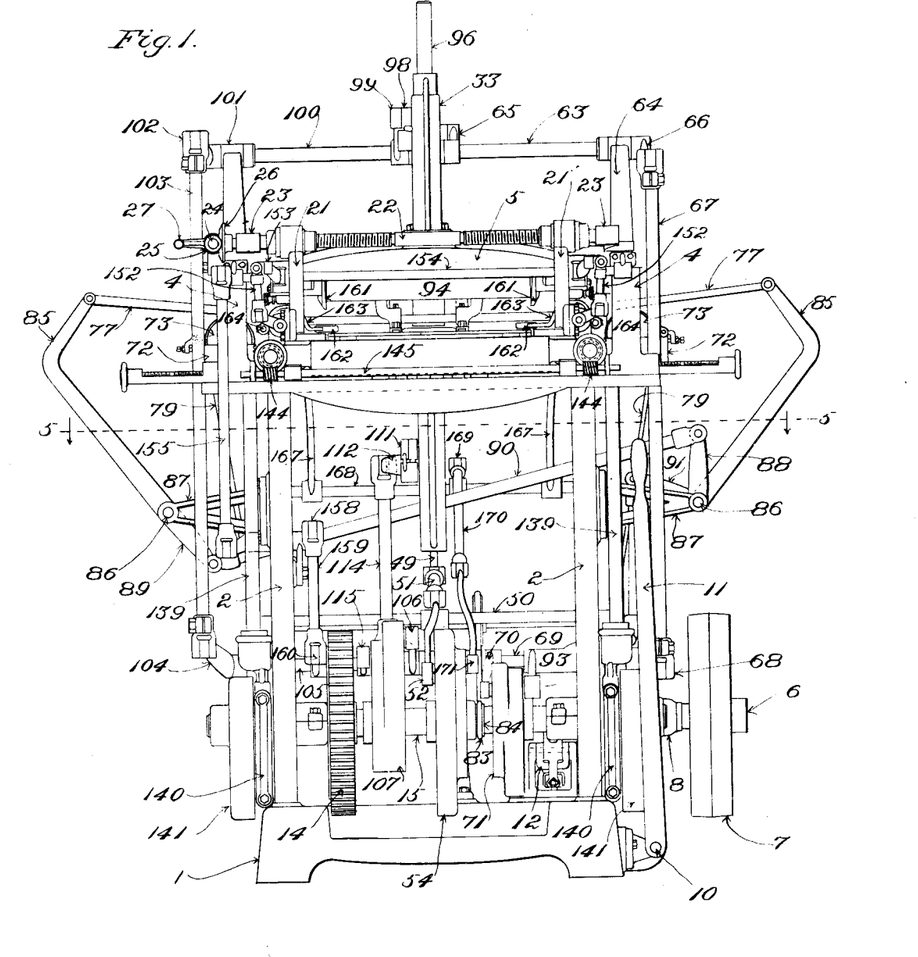
—Figure 1 shows the machine in front elevation.
Figure 2:
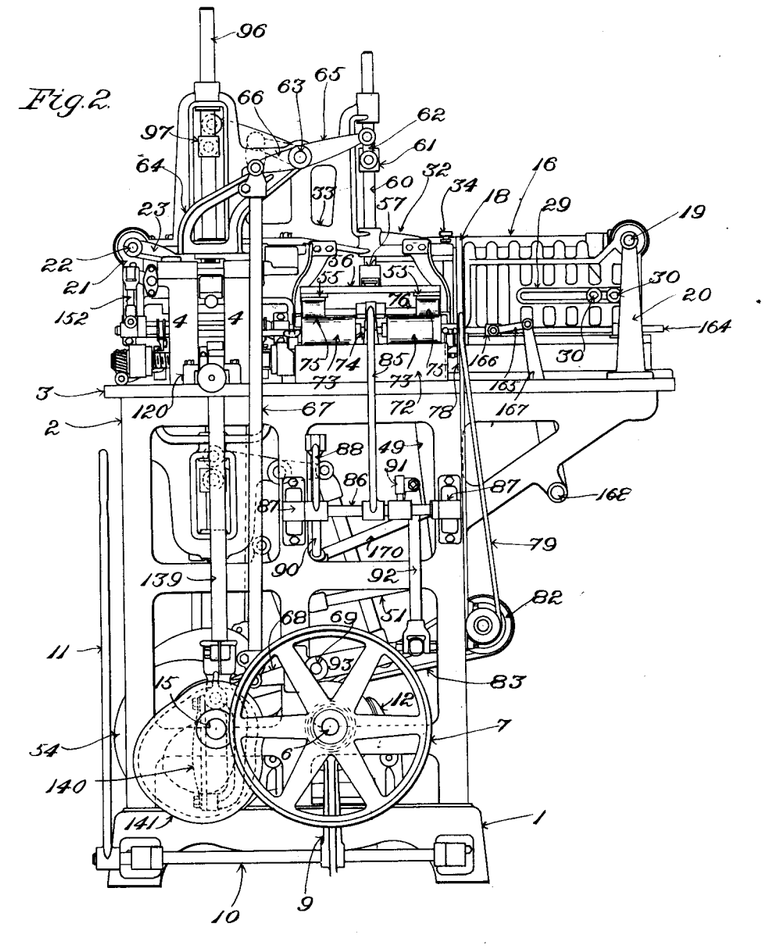
Fig. 2 is an elevation of the machine, looking at the right hand end of the latter.
Figure 4:
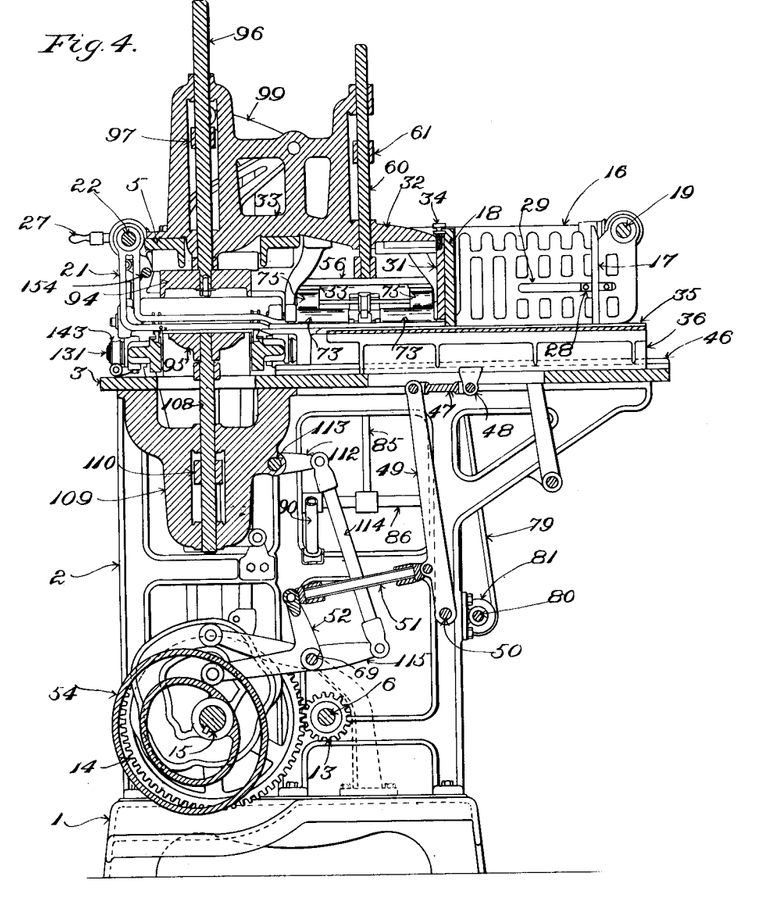
Fig. 4 is a view showing the machine in vertical section from front to rear in a plane located at the middle of the width of the machine.
Figure 5:
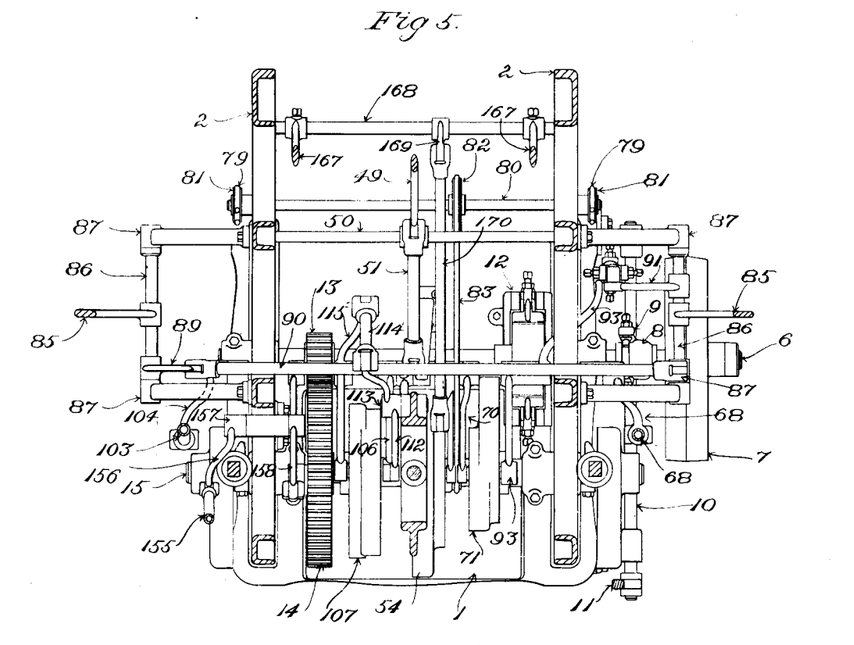
Fig. 5 is a view in horizontal section in the plane of the dotted line 5, 5, of Fig. 1.

The main parts of the frame of the machine are the base 1, the opposite side-frames 2, 2, rising from the said base, the table 3 mounted upon the tops of the said side-frames, the pillars 4, 4, upon the said table, arranged in pairs at the opposite sides of the machine, and the head 5 upon the table between the two pairs of pillars. The driving shaft 6 extends crosswise of the machine and is supported in bearings which are provided in connection with the side-frames 2, 2, at a convenient height in the machine. At 7, Figs. 1, 2, and 5 is a band-pulley, loose upon the said shaft, designed to receive a suitable driving-band (not shown) by means of which it is to be rotated. At 8 is a clutch-hub upon shaft 6, by means of which band-pulley 7 may be made fast with the shaft in ordinary manner when it is desired that the machine shall operate, at 9 a clutch-fork engaging with a grooved portion of the said hub as indicated in Fig. 5, at 10 a rock shaft on which clutch-fork 9 is made fast, and at 11 an operating or shipper-handle on the forward end of the rockshaft for operating the clutch devices by hand to connect and disconnect the driving-power. At 12, Figs. 1. 2 and 5 are braking devices of well-known character arranged to act in connection with the driving-shaft 6 and operated as usual by the clutch-controlling devices already described to quickly arrest the machine when the band-pulley 7 is unclutched from shaft 6, and to release the said shaft when the said band-pulley is clutched to the shaft. At 13, Figs. 4 and 5, is a spur-pinion fast on the driving-shaft 6 and meshing with a spur-gear 14 fast upon the main shaft 15, extending crosswise of the machine and mounted in bearings which are provided in connection with side-frames 2, 2. Shaft 15 carries the cams by means of which the required movements of the various working parts are caused.

The hopper for containing the stack or pile of blanks is located in the upper part of the machine, at the rear thereof, above the table 3. The pasting devices are located next in front of the hopper, and the forming devices are arranged in front of the pasting devices. The feeder is arranged above the table and works beneath the hopper and pasting devices, it acting by one forward stroke thereof to transfer a blank from the bottom of the stack or pile in the hopper into position in connection with the pasting devices to receive paste upon the side-flanges, and at the same time move a previous blank which has had paste applied thereto by the said devices forward from the latter and deliver it in position to be acted upon by the forming devices.

Figure 3:
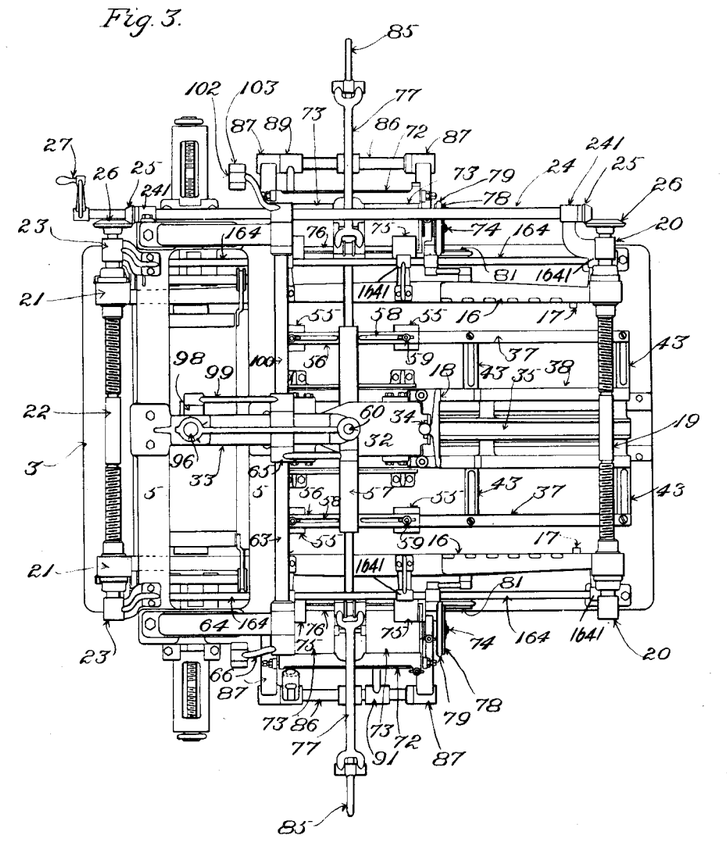
Fig. 3 is a plan thereof.

The hopper comprises, essentially, the opposite side-guides 16, 16, Figs. 2, 3, 4, the back-guides 17, 17, Figs. 3 and 4, mounted upon the said side-guides, and the front-gage 18, Figs. 3 and 4. The side-guides 16, 16, respectively, are supported at their rear ends by the cross-shaft 19, Figs. 2, 3, 4, which in turn is mounted in bearings in uprights 20, 20, Figs. 2 and 3, rising from table 3. Forward extensions 21, 21, Figs. 1, 3, 4, of the said side-guides are supported by a cross-shaft 22 at the front of the machine, the latter cross-shaft being mounted in bearings with which stands 23, 23, Figs. 1, 2, 3, extending forward from pillars 4, 4, are provided. The side-guides 16, 16, as is customary, are adjustable toward and from each other to suit the length of the blanks which it is desired to use. For the purposes of the adjustment the front and rear shafts 22, 19, are each formed with right-and-left screw-threads as shown in the drawings, and the opposite ends of the respective side-guides are furnished with nuts fitting the corresponding screw-threaded portions of the said shafts, so that upon simultaneously rotating the two shafts in the proper directions the side-guides may be shifted bodily toward and from each other. The two shafts 22, 19, are connected together so as to cause them to turn in unison by means of a side-shaft 24, Figs. 1 and 3, mounted in bearings in fixed stands 241, 241, Fig. 3. and provided with bevel-pinions 25, 25, Fig. 3, meshing with bevel-gears 26, 26, fast on the shafts 22, 19. For convenience in making the adjustment by hand, the side-shaft 24 has fixed upon its front end an operating crank-handle 27, Figs. 1, 3, 4. The rear corners of the blanks in the stack or pile contained within the hopper engage with the back-guides 17, 17. To suit variations in the widths of the blanks in the direction from front to rear in the machine, the back-guides are made adjustable in such direction, toward and from the front-gage. This adjustability is secured by furnishing each back-guide with a piece 28, Fig. 4, fitting a slot 29, Figs. 2 and 4, extending horizontally along the corresponding side-guide, and by clamping the said piece at the required point in the length of the said slot by means of small bolts 30, 30, Fig. 2, having washers applied between their heads and the outer surface of the side-guide. Front-gage 18, Fig. 4, is applied to a support 31, Fig. 4, carried by the rearward extension 32 of a casting 33 carried by head 5 of the machine-frame, and is provided as usual with a set-screw 34 by means of which to adjust the same vertically to vary the height of its lower end above the upper surface of the feeder to suit the thickness of the blanks in use at any given time.

Figures 6, 7, 8:
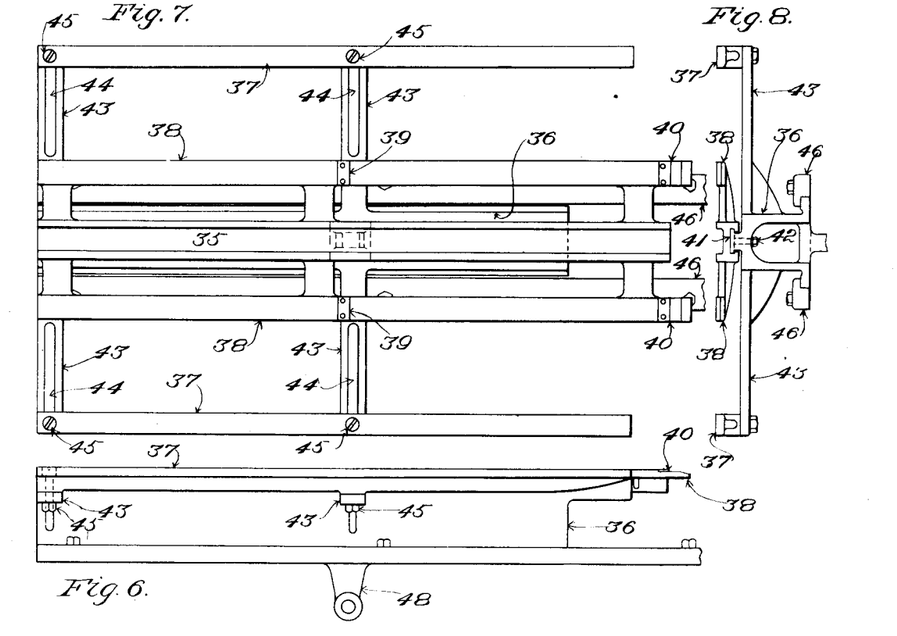
Fig. 6, Sheet 6, shows the feeder in side elevation.
Fig. 7, same sheet, is a plan of the feeder and portions of the guides therefor.
Fig. 8, same sheet, is an end elevation of the parts shown in Fig. 7.

The feeder, shown separately in Figs. 6, 7, 8, Sheet 6, comprises the feeder-body 35, feeder-slide 36, and lateral blank-supports 37, 37. The feeder-body has opposite bars 38, 38, extending parallel with each other from the rear of the machine toward the front thereof, and upon which the blank to be fed rests as customary in the like cases, the said bars being provided with blank-engaging shoulders 39, 39, as usual, for engagement with the rear edge of the bottom blank of the stack or pile when the feeder moves forward from its rearwardly retracted position shown in Figs. 3 and 4, to push such blank forward past the lower end of the front-gage 18. The said bars are provided, in addition, with a second set of blank-engaging shoulders 40, 40, at a distance forward of the first set somewhat greater than the maximum width of blanks to be operated upon in the machine. The feeder-body is mounted upon the top of the feeder-slide 36, and is adjustably connected therewith to enable the feeder-body to be set forward or rearward upon the feeder-slide, as may be required for proper working. The feeder-slide has a top-portion 41, Fig. 8, formed with lateral flanges, and the under side of the feeder-body is grooved to receive the said top-portion and furnished with lips to embrace the said flanges of the top-portion 41. One or more clamping-screws 42, Fig. 8, fitting threaded holes in the said top-portion pass upward through the latter and take against the under side of the feeder-body. By turning the said screws so as to cause their top ends to press the feeder-body upwardly the lips of the latter may be caused to bear firmly against the under sides of the flanges of the feeder-slide, to secure the feeder-body in the required position upon the feeder-slide. The lateral blank-supports 37, 37, consists of bars extending longitudinally of the feeder, and mounted upon arms 43, 43, Figs. 3, 7, 8, projecting transversely from the feeder-slide. The said arms are longitudinally slotted, as at 44, 44, Fig. 7, for the reception of the bolts 45, 45, which clamp the blank-supports thereon, to provide for transverse adjustment of the said blank-supports to suit the length of the blanks being operated upon. The foot-portion of the feeder-slide is confined by guide-strips 46, 46, Figs. 3, 4, 7, 8, fixed upon table 3 and which guide the feeder in its movements. The feeder is operated from the main shaft 15 by means of a connecting-rod 47, Fig. 4, having one end thereof pivoted to a lug 48 projecting downward from the feeder-slide, an arm 49 pivoted by its lower end upon a rod 50 fixed in the side-frames 2, 2, and having the other end of such connecting-rod pivotally connected to its free end, a connecting-rod 51 having one end thereof pivotally joined to the said arm 50, a bell-crank 52 hung upon a supporting cross-shaft 69 mounted on the side-frames and to one arm of which the other end of such connecting-rod 51 is pivotally joined, and a grooved cam 54 fixed upon the shaft 15. The rotation of the shaft and cam causes reciprocating movement to be transmitted to the feeder through the intermediate devices which have been described. The reciprocation of the feeder is sufficient to move a blank from its position at the bottom of the stack or pile in the hopper into position with relation to the pasting devices to be operated upon by the latter.

The pasters are shown at 55, 55, Figs. 2, 3, 4. They are mounted upon bars 56, 56, carried by and forming part of a paster-head 57, one pair at each side of the middle of the machine upon the corresponding bar. The bars are slotted longitudinally, as at 58, 58, Fig. 3, for the accommodation of the screws 59, 59, which clamp the pasters in place upon the said bars, the slots enabling the pasters of each pair to be set at the required distance apart to suit the width of the blank, and the bars being adjustable upon the paster-head transversely of the machine to suit the length of the blank. The paster-head is attached to the lower end of a vertical slide-rod 60 working in guides forming part of the casting 33, and is reciprocated vertically through connections comprising a collar 61 fixed upon the said slide-rod, a link 62 having one end thereof pivotally connected to the said collar, a rocker 63 mounted in bearings provided in the said casting 33 and also in a stand 64 mounted upon the pillars 4, 4, at the right-hand side of the machine in Fig. 1, the said rocker having at its inner end a rearwardly-projecting arm 65 to which the other end of the link 62 is pivotally connected, and at its outer end a forwardly-projecting arm 66 to which is pivotally connected the upper end of a vertical connecting-rod 67 having its lower end joined to the forwardly-projecting arm 68 on the outer end of a rockshaft 69 extending crosswise of the machine and having fixed thereto near the middle of the machine a second forwardly-projecting arm 70 carrying a pin or roll engaged by a grooved cam 71, upon the main shaft 15. Through the rotation of the said shaft and cam, a vertical reciprocating movement is communicated to the paster-head and pasters for the purpose of pressing the pasters upon the side-flanges of a blank which has been fed into the intermediate position by the action of the feeder, and then raising them out of contact with the blank.

For the purpose of supplying the pasters with paste, paste-pans 72, 72, Figs. 1, 2, 3, are located at the opposite sides of the machine, somewhat outside the positions of the pasters, and in connection with each paste-pan is employed a roll or pair of rolls 72, 73, Figs. 1, 2, 3, 4, fixed upon a shaft 74 which extends across the paste-pan and is mounted in suitable bearings at opposite ends of the latter, said roll or rolls being partly received within the paste-pan so as to dip into the contents of the pan, and there is also employed a transferring paste-roll or pair of rolls 75, 75, on a shaft 76 supported by a reciprocating carrier 77 which by its movement outward from the middle of the machine carries the said roll or pair of rolls into contact with the rolls 73, 73, to receive paste from the latter, and by its movement inward toward the middle of the machine carries the transferring rolls into contact with the pasters, thereby furnishing these last with the requisite quantity of paste.

The shaft 74 has combined therewith means for rotating the same and the said roll or rolls for the purpose of constantly presenting freshly-charged surfaces of the said roll or rolls in position above the pan. The rotating means comprises a grooved band-pulley 78, Figs. 2 and 3, fast upon the shaft 74, and an endless driving-band 79, Figs. 1, 2, 3, 4, 5, passing around the said band-pulley, a rotating cross-shaft 80, Figs. 2, 4, 5, in the lower part of the machine at the rear of the latter, mounted in bearings supported by the side-frames 2, 2, and a grooved pulley 81 fast on the said cross-shaft and around which the said driving-band passes also. The said cross-shaft 80 is rotated from the main shaft 15 by means of a grooved pulley 82, Figs. 2 and 5, fast on the cross-shaft, a driving-band 83 and a grooved band-pulley 84, Fig. 1, fast on the shaft 15. The carriers 77, 77, at the opposite sides of the machine have combined therewith operating connections comprising at each side a swinging arm 85 fast upon a rockshaft 86 supported by stands 87, 87, attached to the corresponding side-frame, to which rockshaft the said arm is fixed. The rockshafts and arms at the opposite sides of the machine are connected to move in unison, but oppositely with respect to each other, by means of arms 88, 89, which are fixed to the respective rockshafts, and a connecting-rod 90 joining the said arms with each other. The arm 88 extends upwardly from its rockshaft while the arm 89 extends downwardly from the rockshaft on which it is mounted, and this causes the rockshafts to turn simultaneously but in opposite directions. One of the said rock-shafts is operatively combined with the main shaft 15 by means of an arm 91 fixed thereon, a connecting rod 92 joined at its upper end to the arm 91, a rocker or rocking lever 93 mounted on the cross-shaft 69 but turning freely thereon, and a cam-groove in the cam-disk 71 fast on shaft 15, the rearwardly-projecting arm of the rocker or rocking lever 93 having the lower end of connecting-rod 92 pivotally joined thereto, and the forwardly-projecting arm thereof being provided with a roll or pin which enters a cam-groove in the said cam-disk 71 at the side of the latter opposite that containing the cam-groove for producing the vertical movements of the pasters. As the shaft 15 and the said cam-disk rotate, the carriers 77, 77, and the transferring paste-rolls carried thereby are caused to reciprocate toward and from the pasters. Carriers 77, 77, rest upon suitable guides, over which they slide in their movements.

A blank which by one advancing movement of the feeder is fed forward from the bottom of the stack or pile in the hopper in consequence of the engagement of the rear set of shoulders 39, 39, of the feeder with the rear edge of such blank, is located by the completion of the said advancing movement in position beneath the pasters, and remains there while the feeder recedes to its starting position, and is there acted upon by the pasters, which apply paste to the side-flanges at $c'$, $c'$, etc., Fig. 14, Sheet 5. In the next advance of the feeder, causing its shoulders 39, 39, to engage another blank, and advance the latter from the hopper to the intermediate position, the forward set of shoulders 40, 40, engage with the pasted blank and advance it from the intermediate position into position between the forming-block and follower. In being thus advanced, the pasted blank is guided through the engagement with its ends of the guides 21, 21, constituting extensions of the side-guides 16, 16, of the hopper, and being in consequence adjusted in unison therewith. The forming-block 94 and follower 95, between which the pasted blank is fed by the feeder in the manner just explained are shown best in Fig. 4. In the present instance the forming-block is arranged above and the follower below, but this precise arrangement is not necessary in all embodiments of the invention. The forming-block is attached to the lower end of a slide-rod 96, working in guides in the casting 33. It is operated through connections with the main shaft 15, comprising a collar 97 fast on slide-rod 96, a link 98 having one end thereof connected pivotally to the said collar and the other end thereof connected pivotally to an arm 99 projecting forward from the inner end of a rockshaft 100 upon which it is fast, the said rockshaft being mounted in bearings in the said casting 33 and in a stand 101 rising from the pillars 4, 4, at the left-hand end of the machine, and having fixed upon its outer end a forwardly-projecting arm 102 to which is connected pivotally the upper end of a connecting-rod 103, the latter having its lower end connected pivotally to an arm 104 projecting forward from the outer end of a rockshaft 105 in the lower part of the machine, supported in a bearing with which the left-hand side-frame is provided, the said rockshaft having fixed upon its inner end a forwardly-projecting arm 106 carrying a pin or roll which works in the cam-groove of a cam-disk 107 fast upon shaft 15. The follower 95 is attached to the upper end of a slide-rod 108 working in guides in the casting 109 depending from the table 3 at the front of the machine. It is operated through connections with the main shaft 15 comprising a collar 110 fixed upon the slide-rod 108, a link 111 having one end thereof connected pivotally to the said collar, a lever 112 pivoted at 113 upon the rear portion of the said casting and having the other end of the said link connected pivotally to its forward arm, a connecting-rod 114 having its upper end connected pivotally with the rearwardly-projecting arm of the said lever, a lever 115 mounted loosely upon the rock-shaft 105, and having the lower end of the said connecting-rod joined pivotally to its rearwardly-projecting arm, and with its forwardly-projecting arm provided with a pin or roll working in a cam-groove formed in one side of the cam-disk 107 fast upon the shaft 15. By the rotation of the said shaft and the cam-disk 107, the latter acts through the intermediate trains of mechanism which have been described to cause the forming-block, or, as it may also be termed, the former, to move against the blank and press the latter against the follower, the forming-block and follower then moving in unison into position between the devices for turning the side and end flanges and pressing them into place, and subsequently returning in unison until they have cleared the said devices, after which the forming-block by its greater extent of movement separates from the follower so as to release the box which has been produced by the operation of the machine, the forming-block withdrawing from the said box, and leaving it resting upon the top of the follower. The forming block and follower are actuated by separate cams (in this instance the two cam-grooves which have been described), one for each, and the movements vary in length and time, which is made possible by the use of separate cams, but while the forming block and follower are together they move in unison.

Figures 11, 13:
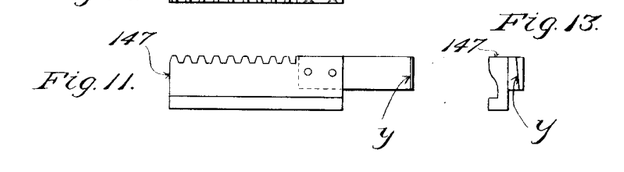
Fig. 11, Sheet 6, is a side elevation of one of the corner-turners, detached.
Fig. 13, same sheet, is an end elevation thereof.
Figure 12:
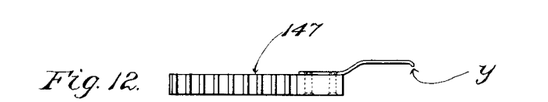
Fig. 12, same sheet, is a plan of the said corner-turner.

Adjacent the forming devices are located the flange-turning, corner-turning, and pressing devices. These comprise oppositely-disposed end-pressers 116, 116, Figs. 9 and 10, Sheet 7, to act against the end-flanges, side-pressers 117, 117, disposed opposite each other, and corner-turners 118, 118, Figs. 9, 10, Sheet 7, and Figs. 11, 12, 13, Sheet 6. The four pressers encircle the normal position of the follower, as shown in Fig. 4, and are so adjusted that in their normal position they shall fit closely around the exterior of the forming-block in the depressed position of the latter. In operation, as the forming-block and follower descend in unison, with a blank clamped in position between them, and with the flanges of the blank projecting at four sides, and as the forming-block presses the central portion of the blank down within the group of pressers, the end and side-flanges are turned upward against the sides of the forming-block. The top portions of the end-pressers 116, 116, are higher than those of the side-pressers and consequently act to turn the end-flanges of the blank in first against the ends of the forming-block. The former and follower then dwell long enough to permit the corner-turners to act. Movement of the corner-turners 118, 118, inward alongside the forming-block turns the bending-parts $d$, $d$, etc., Fig. 14, Sheet 5, of the blank around against the sides of the forming-block. The forming-block and follower then descend farther, so that the side-flanges of the blank are turned by the side-pressers inward toward the forming-block outside the corner-turners and the turned-around bending-parts, so that when the corner-turners are withdrawn and the pressure of the presser-devices is applied such side-flanges shall be caused to adhere to the bending-parts of the end-flanges.

Figure 9:
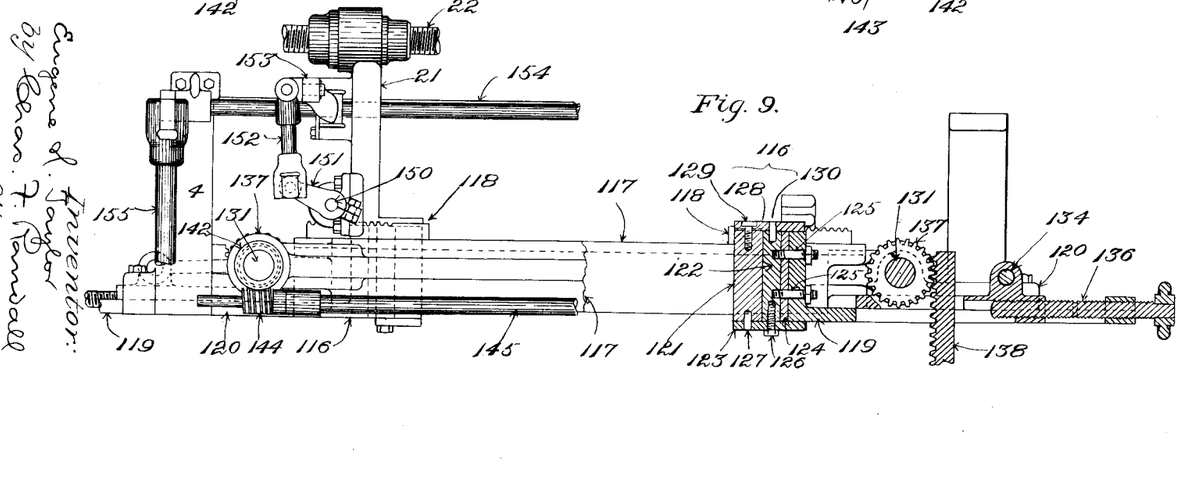
Fig. 9, Sheet 7, is a partly sectional rear elevation of the presser and corner-turner devices, partly broken away.
Figure 10:
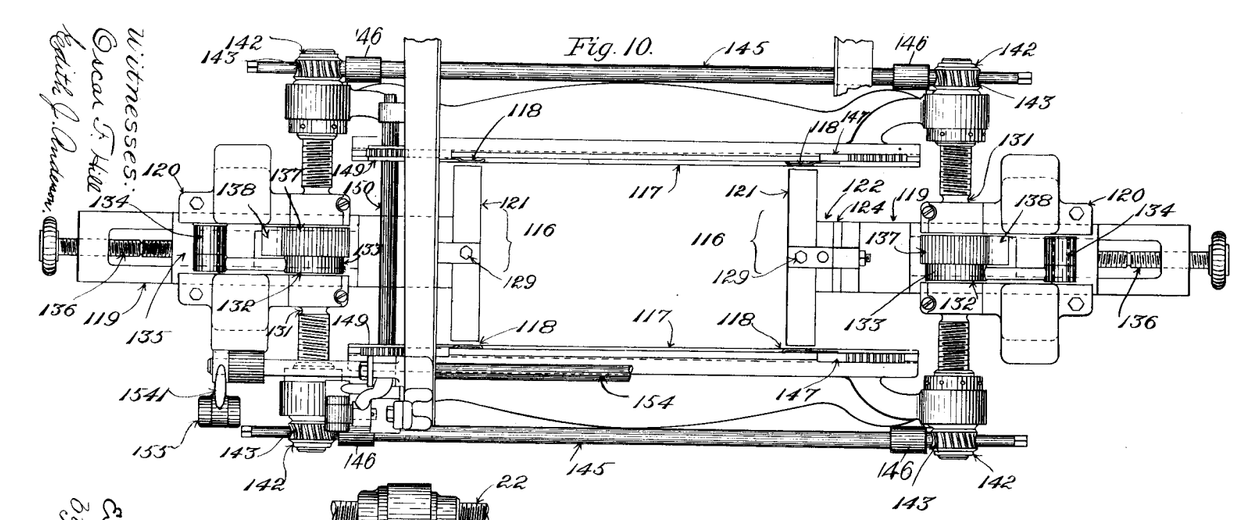
Fig. 10, same sheet, shows the same in plan.

Each end-presser comprises a carrier 119, Figs. 1, 9, and 10, Sheet 7, which is fitted to a fixed guide 120, Figs. 2, 3, 9, 10, to slide lengthwise therein toward and from the adjacent end of the forming-block. The inner end of this carrier is formed with an upwardly-extended portion forming a backing for the holder of the end-plate 121 which acts directly against the end-flange. The said holder comprises a block or plate 122 and a bottom strip or plate 123. Between the block or plate 122 and the inner end of the carrier a cushion 124 of elastic yielding material is placed. The block or plate 122 is furnished with bolts 125, 125, fitting and sliding through holes in the upwardly-extending inner end of the carrier. Thereby the holder is supported on the carrier and guided in its movements. The bottom strip or plate 123 is secured to the lower edge of the block or plate 122 by a screw 126, and its opposite ends project at opposite sides of the said block or plate, one end extending outward beneath the inner end of the carrier 119, and the other end projecting inward to constitute a rest and support for the end-plate 121. This latter end carries a pin or projection 127 entering the bottom edge of the block or plate to keep the same in place. To the upper edge of the end-plate is secured the inner end of the top strip 128 by a screw 129, the said plate projecting outward over the tops of the block or plate 122 and the enlarged inner end of the carrier and resting thereon, and being provided with a projection or pin 130 which enters a hole in the top of the block or plate 122 to assist in keeping the end-plate in place. For the actuation of the end-pressers a short shaft 131 is mounted in fixed bearings at each end of the forming devices. This shaft is furnished with an eccentric 132 which is surrounded by an eccentric strap 133 having the rod-portion thereof pivotally connected with a stud 134 on a carriage 135 which is connected with the corresponding carrier 119. The connection is established by means of a right-and-left screw 136 having one threaded portion thereof engaged with the carrier and the other with the carriage. When the eccentric is rotated, movement transversely of the machine is communicated to the end-presser. For the purpose of operating the eccentrics at the proper times in the working of the machine to produce the required movements of the two end-pressers, each shaft 131 is operatively combined with main shaft 15 by connections comprising a spur-pinion 137 fixed upon such shaft, a vertical rack 138 meshing with the said spur-pinion, an upright rod or bar 139, Figs. 1 and 2, to the upper end of which the said rack is attached, a yoke 140 attached to the lower end of such rod or bar, and a cam-disk 141 fast on shaft 15 and having a cam-groove (shown by dotted lines in Fig. 2) receiving a pin or roll carried by the said yoke. By the rotation of shaft 15 and cam 141 the yoke, rod or bar, and rack, are moved up and down, and thereby the pinion and eccentric are rotated, first in one direction to move the end-presser inward to perform its work of pressing an end-flange, and then outward to return the same to its normal position. By constructing the end-presser with the carrier and carriage, and connecting them in adjustable manner by means of the right-and-left screw, provision is made for convenient adjustment of the end-presser to suit the length of forming-block employed, according to the size of box being made.

The side-pressers 117, 117, have longitudinal acting portions to press against the side-flanges of the blank in forming a box, and have end-extensions which have openings within which are fitted sleeve-like nuts 142, 142, etc. The short shafts 131, 131, have right-and-left screw-threaded portions upon which the said nuts are mounted. Consequently, when the said shafts are rotated by the means which has already been explained the side-pressers are drawn together so as to press the side-flanges of a box toward the forming-block, or are moved apart so as to relieve the pressure and open them away from the finished box. For the purpose of enabling the side-pressers to be adjusted nearer together or farther apart to suit the size of box desired to be made, and enable different sizes to be made, the sleeve-like nuts 142, 142, are adapted to be rotated manually when desired upon the screw-threaded portions of the shafts 131, 131. To this end, each nut is furnished with a worm-gear 143, and the two nuts pertaining to the opposite ends of each side-presser are engaged by worms 144, 144, upon a shaft 145 which is mounted in bearings at 146, 146, upon such side-presser, and provided with squared ends for the reception of a socket-wrench or key for convenience in turning the same by hand in making adjustments. Either side-presser may be adjusted independently to the required extent.

The corner-turners 118, 118, are mounted upon the side-pressers, at or adjacent the ends of the latter, and are fitted upon the side-pressers with capacity to slide lengthwise thereof. The body-portion 147, Figs. 11, 12, 13, Sheet 6, of each corner-turner is formed at its bottom edge with a laterally projecting flange, and the flanged portion is fitted within a longitudinal undercut groove in the upper edge of the corresponding side-presser, as indicated in Figs. 9 and 10, Sheet 7. The acting portion of each corner-turner is formed of a piece, Figs. 11, 12, 13, of elastic strip-material projecting from the inner end of the body 147. For the actuation of the corner-turners at the proper times in the working of the machine, the body-portion of each thereof is formed with a series of teeth, as shown in Figs. 9 to 12, and with the teeth of the two corner-turners at each side of the machine are engaged pinions 149, 149, fixed upon a short shaft 150 which is journaled in bearings carried on the outer side of the corresponding side-guide 21. Each shaft 150 has fixed thereon an arm 151, to which latter is connected one end of a link 152 having its other end connected to an arm 153 that is splined upon a rod 154 extending crosswise of the machine and supported in bearings provided or formed in connection with the front pillars 4, 4. Arm 153 is engaged with the adjacent side-guide 21 so as to cause said arm to accompany the side-guide as the latter is adjusted cross-wise of the machine. Rod 154 has fixed upon the left-hand end thereof an arm 154¹ to which is pivotally joined the upper end of a connecting rod 155 having its lower end connected pivotally with an arm 156 fixed on the outer end of a rock shaft 157 that is mounted in a bearing provided in connection with the left-hand side-frame 2, the said rock shaft having fixed upon its inner end a forwardly-projecting arm 158 to which is connected pivotally the upper end of a connecting-rod 159, the lower end of which is connected with arm 160 hung loosely upon cross shaft 105 and carrying a roll or pin which works in a cam-groove formed in one side of the gear 14 on shaft 15. By the rotation of the said shaft and gear movement is communicated through the intermediate mechanism to the rod 154 to rock the latter, and through the connections described between the said rod 154 and the short shafts 150, 150, the latter are rocked so as, through the engagement of their pinions 149, 149, with the teeth of the corner-turners to move the latter inward along the side-pressers at the proper time to engage with the bending-parts of the end-flanges of a blank which is being operated upon, to turn such bending-parts inward against the sides of the forming-block, and afterward outward along the side-pressers to return them to their normal positions. It will be apparent that when the side-guides 21, 21, are adjusted crosswise of the machine in the manner already explained, the corner-turners are shifted inward or outward, as the case may be, upon the side-pressers in consequence of the engagement of the teeth of the corner-turners with the pinions of the short shafts 150, 150, the latter being carried by the side-guides as already explained. Consequently, the connections just referred to secure conjoint adjustment of the side-guides and corner-turners to suit the size of blanks employed. Boxes vary from one another in the depth of their flanges. To provide for variations in this respect, the corner-turners are made adjustable relative to the side-guides 21, 21, in order that after the adjustment of the said side-guides to suit the length of blank the corner-turners may be set or adjusted inward or outward as the case may be into proper working relations with the ends of the forming block that is employed. To this end, the arm 151 of each shaft 150 is formed with a split socket as shown in Fig. 9 to fit the shaft, and is provided with a screw as shown to clamp it frictionally upon the shaft. On loosening the screw, the shaft may be turned independently of the arm in adjusting the corner turners in or out, after which the screw will be tightened again. Pinions 149, 149, are flanged to fit on opposite sides of the toothed portions of the corner-turners, so that when the side-pressers are adjusted or moved toward or from each other the said pinions, which are splined upon their shafts 150, 150, accompany the side-pressers and corner-turners.

The corner-turners normally occupy a retracted position adjacent the end-pressers. As soon as the end-flanges have been bent against the ends of the forming-block by their encounter with the upper edges of the end-pressers, the corner-turners are moved inward lengthwise of the side-pressers, their acting ends engaging with the bending-parts or lips of the end-flanges of the blank and operating to bend the said portions of the blank around the corners of the forming-block into place against the sides of the forming-block. By the encounter of the side-flanges of the blank with the upper edges of the side-pressers the side-flanges are bent upward into place at the sides of the forming-block outside the bending-parts or lips and the corner-turners which hold the said bending-parts or lips in place. The continued descent of the forming-block and follower carries the flanges of the box downward away from the corner-turners, thus permitting the end-portions of the side-flanges to make contact with the pasted portions of the bending-parts or lips. The actuating devices of the corner-turners are timed to cause these latter to remain in their working position, holding the bending-parts or lips of the blank against the sides of the forming block, while the side-flanges are being turned up into place outside and against the corner-turners, and until by the descending movement of the forming-block and follower the side-flanges have been drawn downward clear of the corner-turners and have been allowed to close completely against the bending-parts or lips. To permit this mode of operation, without removal or collection of paste from the side-flanges by the corner-turners, the working part of each of the latter is formed with an out-turned knife-edge, as $y$, Figs. 11, 12 and 13, Sheet 6. The flat back of the corner-turner presses against the bending-part or lip and holds the latter in place while the side-flange is turned in against this knife-edge, which holds the pasted portion of the side-flange for the time being from contact with the bending-part or lip. As the forming-block continues its descent, the side-flange draws downward along the knife-edge, and finally on clearing the same, is permitted to enter into full contact with the bending-part or lip and adhere to the latter. The knife-edge does not remove or collect paste. It prevents the side-flanges from striking forcibly and suddenly against the adjacent surfaces so as to spatter the paste which such flange carries. It also renders it feasible to cause the corner-turner to remain in working position, holding the bending-part or lip in place. If the bending-part or lip were not thus held, it might assume an outward flaring position in which the inwardly swinging side-flange would contact with it so as to become stuck thereto, forcing the bending-part or lip to assume an improper position. The outturned knife-edge of the corner-turner slopes from the upper edge thereof to the lower so as to allow the side-flange to close in gradually against the bending-part or lip.

In the rising movement of the forming-block 154, after it has begun to separate from the follower the box is stripped from the same by means of strippers 161, 161, located at opposite ends of the forming-block and extending down from the head 5 by which the same are carried. The completed box, supported by the top surface of the follower 95, is pushed forward out of the machine by means of reciprocating ejectors 162, 162, Fig. 1, carried by arms 163, 163, projecting inward from rods 164, 164, Figs. 1, 2, 3, supported in guides $164^1$, $164^1$, Fig. 3, carried by hopper sides 16, 16, at opposite sides of the machine and extending from front to rear. The said rods are operated to cause the ejectors to act at the required time in the working of the machine through connections between the same and the main shaft 15, such connections comprising links 165, 165, Figs. 2 and 3, connected with blocks 166, 166, Fig. 2, upon the respective rods, arms 167, 167, Figs. 2, 4 and 5, at opposite sides of the machine and with the upper ends of which the said links are also connected, a cross-shaft 168 mounted in bearings with which the side-frames 2, 2, are provided at the rear of the machine, and upon which cross-shaft the said arms are fixed, a third arm, 169, fast upon the cross-shaft 168, a connecting-rod 170 having its rear end pivotally connected with the said arm 169, a lever 171, Fig. 1, mounted loosely upon cross-shaft 69 and having the forward end of the said connecting-end joined pivotally to its upwardly-extending arm, the forwardly-projecting arm of lever 171 being provided with a roll or pin which works in a cam-groove formed in one side of cam-disk 54. By the rotation of shaft 15 and the said cam-disk, movement is transmitted through the intermediate mechanism which has been described to the rods 164, 164, and the ejectors carried thereby. The ejecting devices just described act squarely against the rear side of the completed box at or near each end of the latter and push the said box squarely out of the machine. Swinging ejectors such as heretofore have been employed in some cases are objectionable because they sometimes act to turn the boxes around without completely discharging the latter from the machine in which they are employed.

The transversely adjustable supports 37, 37, which are connected with the feeder act frictionally upon the blank which is supported and being advanced by the feeder to hold back such blank against the feeding shoulders 39, 39. They also serve to support the outer portions of the blank under the pressure of the pasters thereagainst in applying paste to the side-flanges at $c'$, $c'$, Fig. 14, Sheet 5.

In the illustrated machine, the parts are timed so that after the flanges of the box-blank and the bending-parts or lips thereof have been turned or bent into their respective places, the end-pressers close in and act against the end-flanges of the box, slightly in advance of the application of pressure by the side-pressers against the side-flanges, and they maintain their pressure upon the end-flanges while the pressure of the side-pressers against the side-flanges continues. Thereby I insure that the end-flanges and their bending-parts or lips shall be in proper position when the side-flanges are closed against the said bending-parts or lips, and shall be maintained in such position until the side-flanges have been united to the bending-parts or lips. This order of precedence in the timing of the action of the end-pressers is attained in the present instance by the fact that the eccentrics 132, 132, arrive at center so as to complete the inward movement of the end-pressers before the screw-threaded shafts 131, 131, complete the inward movement of the side-pressers. The continuance of the pressure of the end-pressers while the side-pressers are completing their inward movement is due to the fact that the eccentrics are so arranged and related that as such inward movement of the side-pressers is nearing completion the eccentrics shall slightly pass center. The end-pressers practically dwell in their innermost position as the eccentrics approach and slightly pass center, particularly if there is a trifle of play in the connections between the eccentrics and the end-pressers. The maintenance of substantially uniform pressure by the end-pressers is aided by the elastic cushions 124, 124, which subserve this function in addition to that of accommodating slight variations in the thickness of the box-blanks which are operated upon. Cushions may be employed in connection with the side-pressers if deemed desirable, but ordinarily the torsion of the screw-shafts 109, 109, will be sufficient to allow the side-pressers to yield to the necessary extent.

I claim as my invention:—

1. In a box-machine, in combination, a hopper adapted to contain a supply of individual blank-units, pasting devices located at the same side of the path of the blank transferred from the hopper by said feeder as said hopper, a reciprocatory feeder by which a blank-unit is transferred from the hopper to the pasting devices and then between the separated forming devices by movement in the same general direction throughout, and forming devices including end and side-pressers at the other side of said path of movement from the hopper and pasting devices.

2. In a box-machine, in combination, a hopper adapted to contain a supply of individual blank-units, pasting devices located at the same side of the path of the blank transferred from the hopper by the feeder as said hopper, a reciprocatory feeder by which a blank-unit is transferred from the hopper to the pasting devices and then between the separated forming devices by movement in the same general direction throughout, and forming devices at opposite sides of said path of movement, the said forming devices including end and side-pressers and corner-turners, all at the other side of the said path of movement from the hopper and pasting devices.

3. In a box-machine, the combination with a hopper for blanks, forming-devices, and pasting-devices arranged to act on a blank intermediate the hopper and forming-devices, of a feeder by which the blank is fed from the hopper to the forming-devices, having side-supports adjustable transversely of the feeder to suit the size of the blank and by which the blank is supported as the pasting-devices apply paste thereto.

4. In a box-machine, the combination with a hopper for blanks, forming-devices, and pasting-devices arranged to act on a blank between the hopper and the forming-devices, of a feeder having a plurality of feeding shoulders to engage a succession of blanks, and provided with transversely adjustable-supports for the outer portions of a blank, and means for operating the said feeder to advance a blank from the hopper to the pasting-devices and from the pasting-devices to the forming-devices by successive feed-movements.

5. In a box-machine, the combination with pasting-devices, feeding devices, and forming-devices, of ejecting devices at the rear of the forming-devices constructed to act at opposite ends of a box, and means to cause said ejecting devices to act along straight lines in ejecting a box from the machine.

6. In a box-machine, the combination with hopper-sides adjustable toward and from each other, pasting-devices, forming-devices, and a feeder, of ejectors mounted upon the said hopper-sides, and adjustable therewith.

7. In a box-machine, the combination with hopper-sides adjustable toward and from each other, pasting-devices, forming-devices, and a feeder, of ejectors, rods carrying said ejectors and mounted upon the said hopper-sides, and means to reciprocate the said rods and ejectors.

8. In a box-machine, the combination with hopper-sides adjustable toward and from each other, pasting-devices, forming-devices, and a feeder, of ejectors mounted in bearings upon the hopper-sides and adjusted with the latter.

9. In a paper-box machine, in combination, the forming-block, the follower, flange-turning and pressing devices, the actuating cam operatively connected with said forming-block, and the actuating cam operatively connected with said follower, whereby the said forming-block and follower are independently actuated, the said cams being constructed to press the forming-block and follower together and then move them in unison between the said flange-turning and pressing devices.

10. In a box-machine, in combination, the former, the follower, and different cams independently operating the said former and follower and communicating thereto movements varying in length and in time, but in unison when the two parts are together, the said cams being constructed to press the forming-block and follower together and then move them in unison between the said flange-turning and pressing devices.

11. In a box-machine, the combination with a former, combined flange-turners and pressers, and means for operating the same, of corner-turners mounted on the said flange-turners and pressers, and independent means to actuate the said corner-turners.

12. In a box-machine, the combination with a former, end-flange combined turners and pressers, and side-flange combined turners and pressers, of corner-turners mounted upon one set of the said turners and pressers, and means to actuate the said corner-turners independently of the said set.

13. In a box-machine, the combination with a former, and box-flange presser-plates coöperating with the respective sides of the said former, of corner-turners movable lengthwise of opposite sides of the former, and means to actuate the said corner-turners.

14. In a box-machine, in combination, a former, pressers to act against flanges of a box-blank, and corner-turners mounted upon the said pressers and working longitudinally thereof.

15. In a box-machine, in combination, a former, pressers to act against opposite sides of said former, and corner-turners mounted upon the said pressers and working longitudinally thereof.

16. In a box-machine, in combination, a former, corner-turners at opposite sides thereof provided with racks, pinions in engagement with said racks, and means for operating the said pinions to reciprocate said corner-turners lengthwise of the said sides of the former.

17. In a box-machine, in combination, a former, pressers to act against said former, corner-turners mounted upon the said pressers and provided with racks, pinions in engagement with said racks, and actuating means for said pinions to cause said corner-turners to move upon said pressers.

18. In a box-machine, in combination, a former, side and end-pressers, corner-turners mounted upon one pair of the said pressers and provided with racks, pinions in engagement with said racks, and actuating means for said pinions to move said corner-turners upon the said pair of pressers.

19. In a box-machine, the combination with a hopper having adjustable side-pieces, of corner-turners, and means for adjusting the same conjointly with the said side-pieces.

20. In a box-machine, the combination with a hopper having adjustable side-pieces, of corner-turners, means for adjusting the same conjointly with the said side-pieces, and means for adjusting the corner-turners independently.

21. In a box-machine, in combination, a hopper having movable side-pieces, a feeder, a former, end and side flange-pressers, corner-turners carried by the side flange-pressers, and means to effect conjoint adjustment of the said side-pieces and corner-turners.

22. In a box-machine, in combination, a hopper having movable side-pieces, a feeder, a former, end and side flange turners and pressers, corner-turners carried by the side flange-pressers, and means to effect conjoint adjustment of the said side-pieces and corner-turners.

23. In a box-machine, in combination, a hopper having movable side-pieces, a feeder, a former, end and side flange-pressers, means to effect conjoint adjustment of the said side-pieces and corner-turners, and means to independently adjust the corner-turners.

24. In a box-machine, the combination with a hopper having adjustable side-pieces, a feeder, a former, and flange-pressers, of side-guides connected with said side-pieces and located adjacent said former to position a blank, and corner-turners linked to the side-guides and adjusted conjointly with said side-guides and side-pieces.

25. In a box-machine, the combination with a hopper, adjustable to accommodate different lengths of blanks, a feeder, a former, and flange-pressers, of corner-turners adjustable in unison with the hopper and also adjustable independently with respect thereto.

26. In a box-machine, in combination, the former, the end-pressers, the side-pressers, the end-shafts respectively screw-threaded for the actuation of the side-pressers and provided with eccentrics in operative connection with the end-pressers and also provided with pinions, and the reciprocatory racks engaging with the said pinions to rotate the said shafts and actuate the pressers.

27. In a box-machine, the combination with the former, the side-pressers, and the end-pressers, of means to produce concurrent operation of all the said pressers, means to adjust the side-pressers independently to suit different sizes of boxes, and means to effect independent adjustment of the end-pressers.

28. In a box-machine, in combination, a former, a presser, an actuating eccentric for the said presser in operative connection therewith, and means to adjust the path of said presser to suit boxes of different sizes.

29. In a box-machine, in combination, a former, opposite pressers coacting therewith, actuating eccentrics for the said pressers, connections for transmitting movement from said eccentrics to said pressers, and means to adjust the paths of movement of the pressers to suit different sizes of boxes.

30. In a box-machine, in combination, a former, a presser, an actuating eccentric, a carriage with which said eccentric is operatively connected, a carrier with which said presser is connected, and an adjusting screw connecting said carrier with said carriage.

31. In a box-machine, in combination, a former, a presser, an actuating eccentric, a carriage operatively connected with said eccentric, a carrier with which said presser is connected, and a right-and-left adjusting screw interposed between said carriage and said carrier.

32. In a box-machine, in combination, a former, end-turners and pressers, side-turners and pressers, corner-turners movable longitudinally upon said side-turners and pressers, actuating end-shafts operatively connected with the respective end-turners and pressers and with the side-turners and pressers, and independent means to operate the corner-turners.

33. In a box-machine, in combination, a former, opposite pressers, corner-turners movable longitudinally upon said pressers and provided with racks, pinions engaging said racks, and a shaft operatively connected with said pinions and actuating the latter to reciprocate the corner-turners.

34. In a box-machine, a former, opposite pressers movable toward and from each other, corner-turners movable upon said pressers and provided with racks, actuating pinions in engagement with said racks, and operating shafts for said pinions upon which the latter move in unison with the pressers.

35. In a box-machine, a former, opposite pressers, adjustable nuts carried thereby, end-shafts respectively having right-and-left threads in engagement with the nuts of the opposite pressers, and means to turn said shafts to move the pressers toward and away from the former.

36. In a box-machine, a former, end-pressers, side-pressers, and means to actuate the said pressers concurrently with the said end-pressers leading in action.

37. In a box-machine, in combination, the former, a hopper having adjustable side-pieces, side-pressers, corner-turners movable longitudinally on said pressers and provided with racks, and actuating shafts accompanying said side-pieces in the adjustments of the latter and provided with pinions in engagement with said racks.

38. In a box-machine, in combination, a former, a hopper having adjustable side-pieces, side-pressers, corner-turners movable longitudinally on said pressers and provided with racks, shafts accompanying the said side-pieces in the adjustments of the latter and provided with pinions in engagement with said racks, actuating means for said shafts, and means to adjust said corner-turners to suit the length of the former.

39. In a box-machine, in combination, end and side flange-turners and pressers, a former movable relatively thereto to effect the turning of the flanges, corner-turners, and actuating means for said corner-turners constructed and operating to hold the same between the inturned bending-parts or lips and the overlying flanges while the relative movement of the former withdraws the said flanges from the corner-turners and enables the said flanges to be closed in against and united with the said bending-parts or lips by the action of the flange-turners and pressers.

40. In a box-machine, in combination, end and side flange-turners and pressers, a former movably relatively thereto, corner-turners having outturned knife-edges, and actuating devices for the said parts constructed and combined to cause the said corner-turners to remain in their working position to cause the said knife-edges to receive the exterior box-flanges when the latter are first turned into place outside the bending-parts or lips of a box-blank.

41. In a box-machine, in combination, end and side flange-turners, a former movable relative thereto, corner-turners having outturned knife-edges and actuating devices for the said parts constructed and combined to cause the said corner-turners to remain in their working position to cause the said knife-edges to hold the exterior flanges from contact with adjacent surfaces when the said flanges are first turned into place.

42. In a box-machine, in combination, end and side flange-turners, a former movable with relation thereto, corner-turners having outturned knife-edges and actuating devices for the said parts constructed and combined to cause the said corner-turners to remain in their working position to cause the said knife-edges to hold the exterior flange from contact with adjacent surfaces when the said flanges are first turned into place, the said knife-edges being inclined in the direction of their length.

43. In a box-machine, the combination with a former, of pressers which constitute flange-turners and also apply the final pressure in completing a box, actuating means for the said pressers, corner-turners mounted on the said pressers, and separate actuating means for the said corner-turners.

44. In a box-machine, the combination with a former, of presser-plates to turn the flanges and also apply the pressure in completing and uniting a box, actuating means for the said presser-plates, corner-turners mounted on the said presser-plates, and separate actuating means for the said corner-turners.

In testimony whereof I affix my signature in presence of two witnesses.

EUGENE H. TAYLOR.

Witnesses:
CHAS. F. RANDALL,
EDITH J. ANDERSON.